May 17, 1960     R. J. MILLARD     2,936,514
ELECTROLYTIC DEVICE
Filed Oct. 24, 1955
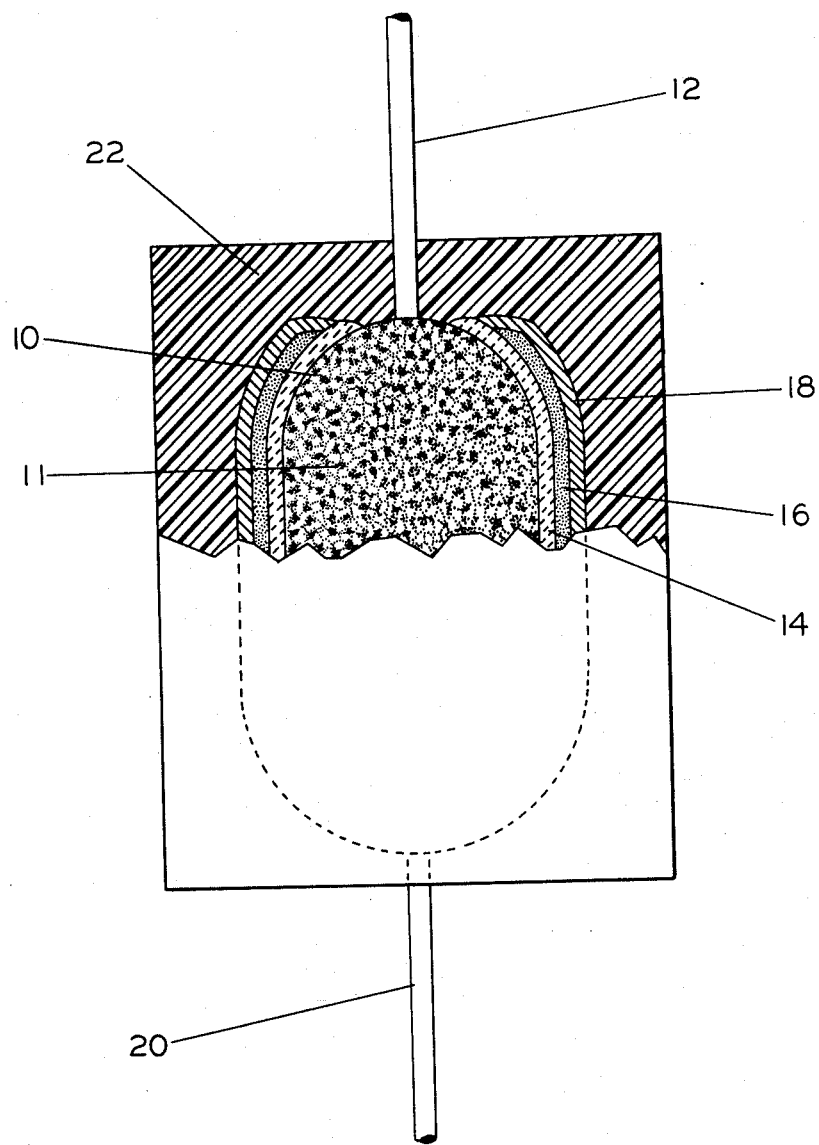
RICHARD J. MILLARD
*INVENTOR.*
BY *Roland A. Dexter*
HIS ATTORNEY United States Patent Office 2,936,514
Patented May 17, 1960

2,936,514

ELECTROLYTIC DEVICE

Richard J. Millard, Williamstown, Mass., assignor to Sprague Electric Company, North Adams, Mass., a corporation of Massachusetts Application October 24, 1955, Serial No. 542,205

6 Claims. (Cl. 29—25.31)

This invention relates to electrolytic capacitors and more particularly to a process for producing electrolytic capacitors having a solid electrolyte, as well as the product resulting therefrom.

The electrolytic capacitor art has developed rapidly in the past several decades, which development has been directed both to extensions of the operational temperature range of these devices to both higher and lower limits and to greater capacity per unit volume. It is no doubt apparent that the severe temperature limitations of aqueous electrolytes have led to the development of non-aqueous systems of greater operational temperature range, e.g. from −50° C. to above 100° C. As a natural transition beyond the non-aqueous system so as to extend the temperature range, solid electrolytes must be used. As yet, solid electrolytes have not been commercially produced, although the concept has been published; however, none teach a device suitable for incorporation into electronic gear.

With the advent of transistor circuitry requiring relatively low voltages, extremely large improvements in capacity per unit volume were obtained by reducing the thickness of the anodic film on the valve metal serving as the anode in the electrolytic capacitor. The sintered tantalum pellet, particularly dramatically improved the capacity per unit volume over the prior known etched foil type of electrode. Still greater capacity per unit volume over that known to the art must be achieved if present day limitations on volume for electronic gear are to be met. Even though miniaturization has been achieved by the pellet, it still has a limited temperature range which must be extended.

It is therefore an object of this invention to overcome the foregoing and related disadvantages of the prior art electrolytic capacitors.

It is a further object of this invention to produce a solid electrolyte electrolytic capacitor of higher capacity per unit volume than presently known capacitors using conventional electrolyte systems.

It is a still further object of this invention to produce electrolytic capacitors having improved electrical characteristics, particularly with regard to leakage current, frequency stability and temperature stability, over that which obtains with prior art constructions.

Further objects of this invention will be apparent from the following specification and appended claims.

In accordance with this invention the objects set forth above have been achieved by a novel process for the production of sintered tantalum pellet electrolytic capacitors having a solid electrolyte which includes the step of in situ conversion of a manganese salt disposed within the crevices of a formed tantalum pellet by firing at a temperature of from about 300° to about 450° C. The product produced in accordance with the teachings of this invention is a tantalum pellet solid electrolyte capacitor comprising an oxide coated tantalum pellet of from about 35% to about 45% porosity with a manganese dioxide electrolyte disposed within and substantially filling the pores of said tantalum pellet contiguous with said oxide coating, said manganese dioxide resulting from a plurality of in situ thermal conversions of a manganous salt by firing at a temperature of from about 300° C. to about 450° C., said oxide coating being obtained by a plurality of electrolytic oxidations of said tantalum pellet, and finally having a peripheral metal cathode coating disposed about said manganese dioxide electrolyte on a granular carbon layer contiguous with said electrolyte and said cathode coating.

Perhaps the invention can be most fully understood by consideration of the basic structure of the solid electrolytic capacitor which is subjected to a basic novel processing step to obtain the electrolytic capacitor having the unique electrical characteristics of this device. The device of the invention is shown in cross-section in the sole drawing which is appended to the specification. Upon reference to this drawing it is seen that the anode consists of sintered particles of a valve forming metal 10 such as aluminum, tantalum, zirconium and columbium which is compressed about the anode lead 12. The sintered pellet of valve metal which for purposes of this discussion shall be considered a sintered tantalum pellet, as this is the preferred structure, has a thin oxide coating 11 of tantalum oxide which serves as the dielectric layer of the capacitor structure. Substantially filling the pores of the tantalum pellet and contiguous with the oxide coating is a layer of manganese dioxide 14 which has resulted from in situ thermal conversions of a manganous salt by firing at a temperature of from about 300° C. to about 450° C. Disposed upon the surface of the manganese dioxide layer 14 is an outer layer of carbon particles 16 which serves to form a low resistance contact from the manganese dioxide layer 14, which must be in not only the pores but also form a discrete surface layer, to the outer electrode 18 usually of a metal such as sprayed copper. Further suitable cathode metals include zinc, tin, silver and gold. Attached to the outer electrode 18 which serves as the cathode is the cathode lead 20 which extends through the outer casing 22 as does the anode lead 12.

The anode structure of this device is of a tantalum pellet made from pressed and sintered tantalum metallic powder. This sintered pellet is well-known to the art and can be produced not only from sintered metallic powder but from tantalum coated ceramic powder produced in accordance with the teachings of the Rogers copending application, Serial No. 517,135, filed June 22, 1955. The sintered tantalum pellet can be spot welded or otherwise electrically joined by suitable connecting means to the anode lead wire 12. Also suitable where extremely small physical size and low capacity are demanded is a formed etched tantalum wire as the anode. For most applications, however, the sintered pellet is preferred.

To the sintered porous pellet of an electrolytic valve forming metal, the fabrication of which does not form part of this invention, one or more of the basic steps in the processing of the device must be applied to obtain the article of the invention. Basically the improved characteristics of my novel process arose out of the in situ conversion of a manganese salt which is disposed within the crevices of a formed tantalum pellet, at a temperature of about 300° C. to about 450° C. The other process step which is to be followed to produce the electrically optimum device is the electrical reformation of the oxide film which functions as the primary dielectric of the electrolytic capacitor. This reformation follows the in situ conversion of the manganese salt. Such reformation materially decreases the leakage current whereas the in situ conversion of the manganese salt by means of firing within the restricted temperature range greatly increases the total capacity, as well as reducing the internal resistance and leakage current. Thus it is seen that the firing is a basic step in the novel process while the reformation further enhances the electrical characteristics of the device.

To prepare a solid state electrolytic device in accordance with this invention the tantalum pellet useful as the anode is of 39% porosity (of about 35 to 45% porosity is found to be most suitable). The porosity is determined by dividing the weight of the pellet by the product of the density of the metal by the volume of the pellet. This pellet consisting of compressed and sintered tantalum powder having a particle size distribution of between 0.2 and 35 microns, is subjected to formation by disposition in an electrolyte and subsequent imposition of a current flow. A suitable formation electrolyte is a solution of manganous nitrate in water. During formation to a typical voltage of 12 volts the current density should not exceed 30 milliamps per gram of the tantalum pellet and the electrolyte temperature maintained at 90° C.±2° C. After the leakage current has dropped down to an acceptable value, e.g. 10–15 microamperes, the formed pellets are heated for 15 minutes at 400° C. This is to remove all remains of the formation electrolyte by thermal purging which includes decomposition, sublimation and volatilization. Other formation electrolytes comparable to the manganous nitrate include ammonium chloride, ammonium nitrate, ammonium acetate and ammonium formate. These salts are in aqueous solution which formation electrolyte should have a resistivity range of from about 10 to about 15 ohm-centimeters at 90° C. The manganous nitrate formation electrolyte referred to above has about 120 grams of the salt per liter of water to obtain the desired resistivity.

Thereafter the tantalum pellet is vacuum impregnated with a 50% manganous nitrate solution (specific gravity of about 1.5) at room temperature after which the vacuum is broken and the units allowed to stand in the solution for a period of 10 minutes.

In addition to manganous nitrate there are other manganous salts which decompose to form manganous oxide such as the oxalate, formate and acetate. Of course, the impregnant is understood to be an aqueous solution of the thermally decomposable manganous salt.

Thermal in situ conversion of the impregnated pellet is done in a vented furnace at 400° C. for five minutes or at least until the brown fumes of $NO_2$ are no longer generated. Two further impregnation-thermal conversions are carried out.

Then the unit is reformed to 12 volts in the above formation electrolyte until the leakage current is reduced to about 0.6 milliampere. After drying as above, reimpregnation with a manganous nitrate aqueous solution of about 1.77 specific gravity is accomplished by allowing the pellet to stand in the solution for 5 minutes, which solution is at a temperature of 90° to 100° C. Firing is again conducted for 5 minutes at 400° C. after which the impregnation-firing cycle is repeated two more times. Again electrochemical reformation in the formation electrolyte is conducted, which reformation is at 12 volts until the leakage current of about 0.6 milliampere is reached. Again the formation electrolyte is thermally purged by heating the unit for 16 hours at 180° C. This thermal purging is preferably conducted at a temperature below 200° C. to prevent fracture of the oxide film. The duration of heating may extend beyond 16 hours if desired to more thoroughly thermally purge the pellet of electrolyte residue.

It is necessary that the solid electrolyte layer 14 be positioned between the pellet 10 and the cathode 18 and/or the contact layer 16 everywhere so as to prevent shorting of the device. It often times is desirable to continue the layer 14 to the anode lead 12, thus completely enveloping the pellet 10, thus insuring absence of shorted units. The manganese oxide functioning as the solid electrolyte is believed an "$n$" type semiconductor and has a resistivity at 20° C. of from about 1.0 to about 1.5 ohm-centimeters.

One now has the optimum produced solid state electrolyte and all that remains is to make electrical contact to the solid electrolyte. This is accomplished by disposition of a colloidal graphite layer on the manganese dioxide strata by dipping in a colloidal graphite aqueous dispersion having a solids content of approximately 7%. The graphite or other suitable particular conductor, although it need not be used, increases the capacitance and lowers the series resistance of the unit. This deposition is followed by drying at 100° C. for 15 minutes to drive off the moisture after which the cathode is applied by means of spraying from a Schoop metallizing spray gun. Thereafter a solderable lead such as tin-copper is soldered to the negative electrode at the bottom of the unit. The tantalum anode lead wire is welded to a wire which serves as the anode contact. The fabricated unit is to be maintained in an atmosphere of about 0% relative humidity prior to encapsulation. This encapsulation as shown in the drawing may be either of a molded or cast resin such as silica filled epoxy or mineral filled phenol formaldehyde or for extremely high temperature operations of a ceramic nature, e.g. vitreous enamel. An alternative casing is a hermetically sealed can with or without potting in a hydrophobic material such as wax.

Such a device as prepared above has a capacitance of about 65 microfarads and equivalent series resistance of less than 2 ohms when measured at a frequency of 120 cycles per second, and remarkably low leakage current. Most astonishing is the incorporation of 65 microfarads capacity in a cylinder about 0.215 inch long and having a diameter of 0.112 inch. Further the temperature and frequency stability is markedly improved over known devices.

As many apparently widely different embodiments of this invention may be made without departing from the spirit and scope hereof, it is to be understood that the invention is not limited to the specific embodiments hereof except as defined in the appended claims.

I claim:

1. The process for producing tantalum pellet electrolytic capacitors having a manganese dioxide electrolyte including the steps of converting a manganous salt disposed within the crevices of an oxide coated tantalum pellet to manganese dioxide by firing at a temperature of from about 300° C. to about 450° C. for a period of at least 5 minutes, electrolytically reforming of the oxide coating of said tantalum pellet, disposing additional manganous salt in said crevices and firing within said temperature range of from about 300° C. to about 450° C. and thereafter electrolytically reforming said oxide coating of said tantalum pellet, coating the pellet with a moisture-free layer of carbon particles and finally spraying said pellet with a metal coating.

2. A process for producing a capacitor, said process being characterized by the steps of providing a porous tantalum body in which the tantalum surface has an in situ formed coating of tantalum oxide, applying to the tantalum oxide coating a layer of a solution of a manganese salt decomposable upon heating to form manganese oxide, drying the solution layer, heating the dried layer at a temperature of from about 300° to about 450° C. to convert it to manganese oxide, reforming the oxide coating on the tantalum surface, applying a layer of a solution of a decomposable manganese salt to said coated tantalum body, drying the additional solution layer, heating the additional dried layer at a temperature of from about 300 to about 450° C. to convert it to manganese oxide, reforming the tantalum oxide coating on the tantalum surface and applying an electrically conductive connection to said manganese oxide.

3. A process for producing an improved body for incorporation in a tantalum pellet electrolytic capacitor, said process characterized by the steps of providing a porous tantalum body in which the tantalum surface has an in situ formed coating of tantalum oxide, applying to the tantalum oxide coating a layer of a solution of a manganese salt decomposable upon heating to form manganese oxide, drying the solution layer, heating the dried layer at a temperature of from about 300 to about 450° C. to convert it to manganese oxide, reforming the oxide coating on the tantalum surface, applying a layer of a solution of a decomposable manganese salt to said coated tantalum surface, drying the additional solution layer, heating the additional dried layer at a temperature of from about 300 to about 450° C. to convert it to manganese oxide and subsequently reforming the tantalum oxide coating on the tantalum surface.

4. The process of producing a capacitor body comprising, providing a tantalum oxide coated porous tantalum pellet with a manganese salt disposed within its crevices, converting said salt to manganese dioxide by firing at a temperature of from about 300 to about 450° C., electrolytically reforming the oxide coating of said tantalum pellet, disposing additional manganese salt in said crevices and firing within said temperature range of from about 300 to 450° C., and thereafter electrolytically reforming said oxide coating of said tantalum pellet.

5. The method as in claim 4 wherein the temperature of firing the salt is substantially 400° C.

6. The method as in claim 4 wherein the salt disposed within the crevices of the tantalum pellet is manganous nitrate, and said conversion steps being repeated with further manganeous nitrate disposed within the crevices.

References Cited in the file of this patent

UNITED STATES PATENTS 2,299,228     Gray et al. _____ Oct. 20, 1942